C. CRAWFORD.
TIRE CARRIER.
APPLICATION FILED OCT. 7, 1914.

1,160,141.

Patented Nov. 16, 1915.

Witnesses
Geo. E. Kricker Jr.
A. L. Phelps

Inventor
Carl Crawford.
By
C. C. Shepherd, Attorney

UNITED STATES PATENT OFFICE.

CARL CRAWFORD, OF COLUMBUS, OHIO.

TIRE-CARRIER.

1,160,141.          Specification of Letters Patent.        Patented Nov. 16, 1915.

Application filed October 7, 1914. Serial No. 865,574.

*To all whom it may concern:*

Be it known that I, CARL CRAWFORD, a citizen of the United States, residing at Columbus, in the county of Franklin and State of Ohio, have invented certain new and useful Improvements in Tire-Carriers, of which the following is a specification.

This invention relates to extra tire carriers and is constructed to accommodate both new tires and those that have been used for some considerable time.

It is known that after tires have been in use for a given time, their circumference is increased to some considerable degree and to this end, this carrier is designed to accommodate either normal sized or over-sized tire casings.

Therefore, the main object of this invention resides in the provision of an expansible or contractible ring member, the adjustment being within such limits to accommodate the increase in size of tires fitting a given sized wheel. In order to prevent the entrance of dust, dirt and moisture, into the interior of what is known as a pneumatic tire casing, this ring member is made of flat band-like material shaped to assume an annular form. The width of the ring member is such that the normally open annular space between the two feet of a tire casing may be kept closed. The expansible nature of the ring further insures a close fit between the carrier itself and the casing feet.

A further object of this invention resides in providing a plurality of radially outwardly extending clips located on both sides of the ring, these clips being confined to less than half the circumference of the ring itself. By confining these clips to less than half the circumference it is an easy matter to place a tire on the same and this tire may then be held in position by the assistance of the frictional grip by expanding the ring, or supplemental holding means may be resorted to on that portion of the circumference not covered by the clips themselves.

Figure 1:
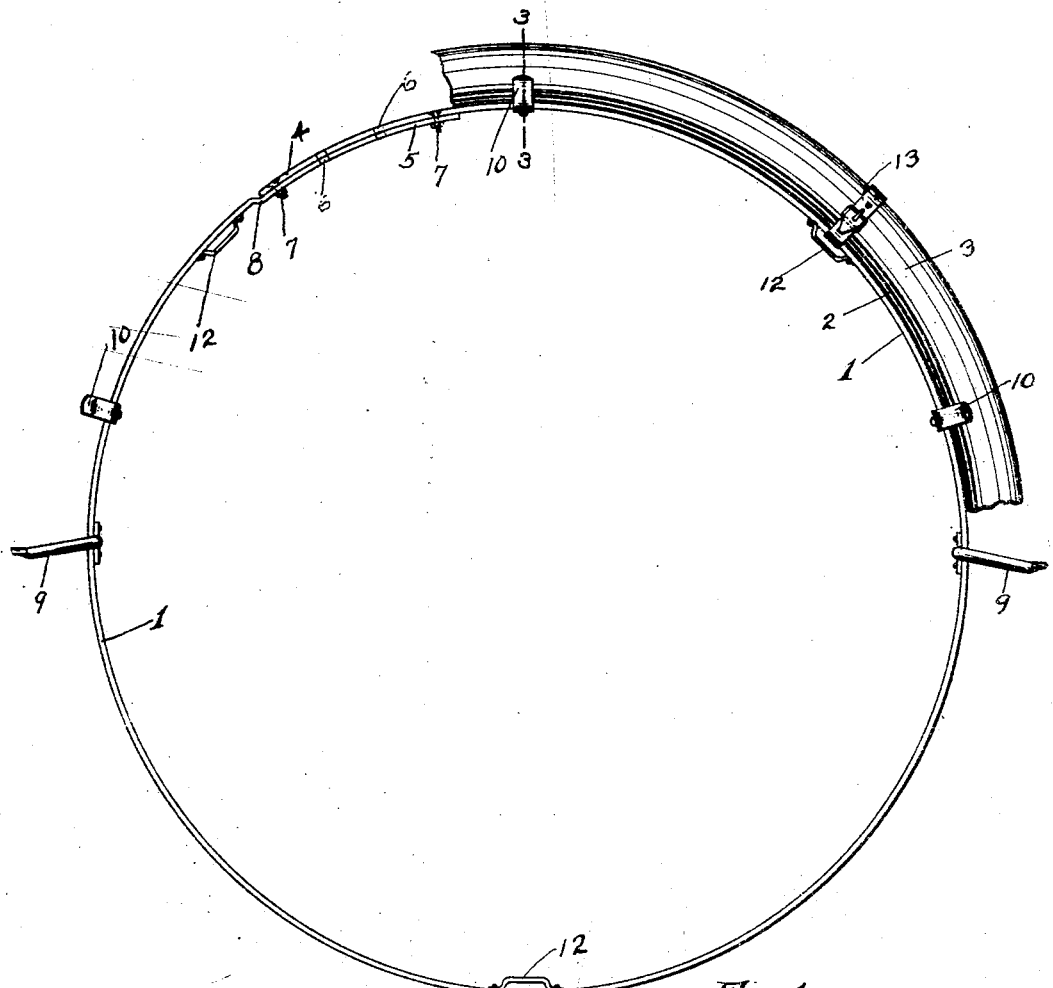
Figure 2:
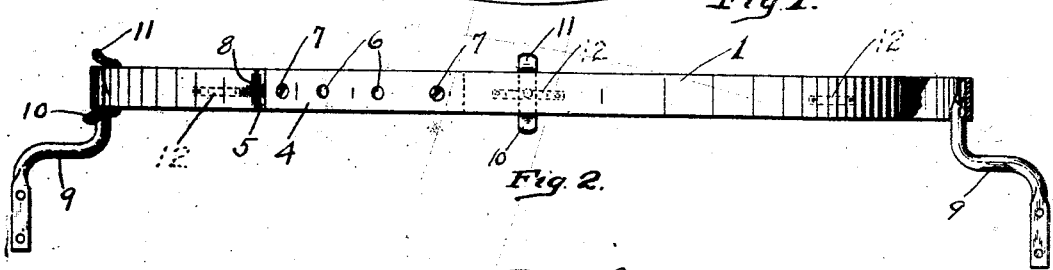
Figure 3:
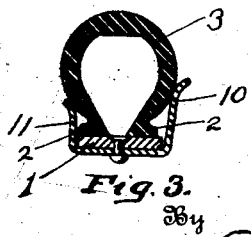

The preferred embodiment of this invention is shown in the accompanying sheet of drawings, in which similar characters of reference designate corresponding parts, and in which:

Figure 1 is a view in side elevation of the tire carrier showing a portion of a pneumatic casing in position, Fig. 2 is a top plan view, a slight portion being broken away, of the structure shown in Fig. 1, and, Fig. 3 is a section taken on line 3—3 of Fig. 1.

In the drawings, the band member is shown at 1 as being shaped to assume an annular form, the width of this band member being such as to completely inclose the open portion along the interior periphery of a pneumatic tire casing as is shown in Fig. 3. It is further desirable that this band member be of such width that the feet 2 of the casing shown at 3 be given a firm and sufficient bearing surface. The ends 4 and 5 of the band member 1 are each provided with a plurality of apertures 6, these apertures being so located with respect to each other, that they register when the two ends are in overlapping position. These ends are then firmly secured together, as, for instance, by means of the bolt and nut structures shown at 7, to insure the maintenance of true annular form of the band member, two bolts being sufficient to maintain this shape while the remaining apertures may be resorted to when it is desired to either expand or contract the band member to assume either a greater or less diameter as occasion may arise. In order that a smooth surface may always be presented upon which the feet of the tire casing may rest, the leg 5 is crimped as is shown at 8, this crimp being of a depth approximately equaling the thickness of the opposite end 4 of the band member. The entire band member may be supported in any desirable manner from the body of a vehicle, an instance of this support being the outwardly projecting bracket arms 9, as shown.

In order that a tire casing may be easily held in position, there are provided a plurality of radially outwardly extending clips 10 and 11, the clips 10 being of slightly greater length than the clips 11. Preferably, there are provided three sets of these clips spaced, as shown in Fig. 1, wherein all three sets are located on less than one-half the circumference of the circular band. This arrangement is made so that the tire casing may be set in position on the upper half of the carrier and then slid into position on the lower half. If there were a number of clips projecting outwardly from this lower half, it would be impossible to easily place a tire in position, where this tire casing was of annular form. A plurality of holding members 12 are also secured to the interior portion of the ring member through which straps 13 may be passed and these straps subsequently fastened about the casing to securely hold it in position. Where only one casing is held upon the carrier, a strap passed around the casing through the member 12 on the lower half of the carrier will be sufficient. The clips 11 are made slightly less in height than the clips 10 and these clips, together with the band 1 itself, are so arranged that the average tire casing of a given size will be made to project slightly to overlie the top of the clips 11. Should it then be desired to carry two casings by means of this carrier instead of one, this second casing may be held in position by means of the straps 13 and the tighter these straps are drawn, the tighter the two casings will be forced into engagement with each other. If the casing 3 overlies the tops of the clips 11, there is little likelihood that the second casing would be scarred or gouged by continual jars by the rubbing contact with the clips themselves.

It will thus be apparent that there is provided a tire carrier wherein either new or used casings may be carried, provision being made for expanding the supporting ring itself to assume various sizes. Further, the mode of carrying and attaching a tire on to this carrier is of a simple and efficient nature.

What it is desired to secure by Letters Patent:

1. An extra tire carrier comprising a band of material shaped to present an endless circular member, a plurality of straps for encircling said band, and a tire carried thereby, strap holding means carried by said member whereby said straps are held in position when encircling said band and the tire carried thereby, and bracket arms attached to said member and projecting laterally beyond the plane of said circular member for attachment to a vehicle body.

2. An extra tire carrier comprising a band of material shaped to present an endless circular member, a plurality of straps for encircling said band and a tire carried thereby, strap holding members carried by the inner side of said member through which said straps pass, and bracket arms attached to said member and projecting laterally beyond the plane of said circular member for attachment to a vehicle body.

3. An extra tire carrier comprising a ring formed of a straight flat piece of material, the ends of said piece overlapping each other, means for holding a tire in position on said ring, bracket arms carried by said member to support it from a vehicle body, and means whereby the overlapping ends of said ring may be moved relatively and locked to expand or contract the ring.

4. An extra tire carrier comprising a ring formed of a straight flat piece of material, the ends of said piece overlapping each other and one end being crimped to present a smooth surface when overlapped by the other end, means for holding a tire in position on said ring, bracket arms carried by said member to support it from a vehicle body, and means whereby the overlapping ends of said ring may be moved relatively and locked to expand or contract the ring.

5. An extra tire carrier comprising a ring formed of a straight flat piece of material, both ends of said piece having a series of apertures therein arranged to register when the ends are overlapped, bolts for holding said ring in expanded or contracted position by means of said apertures, and means for holding a tire in position on said ring.

6. An extra tire carrier comprising a ring of flat material, a plurality of clips extending radially outward from both sides of said ring, said clips being confined to less than one-half the circumference of said ring, and means on the other half of the circumference of said ring for holding a tire in position.

7. An extra tire carrier comprising a ring formed of a straight flat piece of material, means for adjustably connecting the ends of said piece so that said ring may be expanded or contracted, a plurality of clips extending radially outward from both sides of said ring, said clips being confined to less than one-half the circumference of said ring, and means on the other half of the circumference of said ring for holding a tire in position.

In testimony whereof I affix my signature in presence of two witnesses.

CARL CRAWFORD.

Witnesses.
WALTER E. L. BOCK,
A. L. PHELPS.